(12) United States Patent
Seltzer et al.

(10) Patent No.: US 9,709,793 B1
(45) Date of Patent: Jul. 18, 2017

(54) DEPLOYABLE STRUCTURE

(71) Applicant: Ball Aerospace & Technologies Corp., Boulder, CO (US)

(72) Inventors: Aaron J. Seltzer, Boulder, CO (US); David M Waller, Westminster, CO (US); Lawrence J. Campbell, Westminster, CO (US); Ryan T. Thompson, Longmont, CO (US); Dustin S. Putnam, Broomfield, CO (US); William D. Tandy, Boulder, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 85 days.

(21) Appl. No.: 14/587,342

(22) Filed: Dec. 31, 2014

Related U.S. Application Data

(60) Provisional application No. 61/922,539, filed on Dec. 31, 2013.

(51) Int. Cl.
*G02B 23/20* (2006.01)
*G02B 27/42* (2006.01)
*G02B 5/18* (2006.01)

(52) U.S. Cl.
CPC ............... *G02B 23/20* (2013.01); *G02B 5/18* (2013.01); *G02B 27/4205* (2013.01); *G02B 2005/1804* (2013.01)

(58) Field of Classification Search
CPC ...... G02B 23/20; G02B 5/18; G02B 27/4205; G02B 2005/1804; E06B 3/48; E06B 3/481; E06B 3/5009; E06B 3/5018

USPC ........................................ 359/399; 160/84.04
See application file for complete search history.

(56) References Cited

U.S. PATENT DOCUMENTS

| | | | | |
|---|---|---|---|---|
| 1,483,125 A | * | 2/1924 | Singer | B65D 5/5206 |
| | | | | 206/45.22 |
| 3,397,399 A | * | 8/1968 | Carman | F24J 2/125 |
| | | | | 135/33.2 |
| 4,550,973 A | | 11/1985 | Hufnagel | |
| 4,977,560 A | | 12/1990 | Wantuck | |
| 5,287,218 A | | 2/1994 | Chen | |

(Continued)

OTHER PUBLICATIONS

"First Folding Space Telescope Aims to "Break the Glass Ceiling" of Traditional Designs", DARPA News, Dec. 5, 2013, printed May 17, 2016 from http://www.darpa.mil/news-events/2013-12-05, 4 pages.*

(Continued)

*Primary Examiner* — Frank Font
(74) *Attorney, Agent, or Firm* — Sheridan Ross P.C.

(57) ABSTRACT

A deployable structure having a plurality of panel elements is provided. Adjacent panel elements are connected to one another by hinges. The hinges allow the panel elements to be placed in a stowed or folded configuration, in which adjacent pairs of panel elements are folded against one another to provide a relatively compact assembly. Biasing members can be provided to transition the deployable structure from the stowed configuration to a deployed configuration. When in the deployed configuration, the relative positions of the panel elements of the deployable structure are maintained, at least in part, by locating interface assemblies. The deployable structure may have a generally annular configuration when deployed.

19 Claims, 10 Drawing Sheets

(56) References Cited

U.S. PATENT DOCUMENTS

| | | | | |
|---|---|---|---|---|
| 5,898,529 | A * | 4/1999 | Meyer | G02B 23/00 |
| | | | | 343/781 P |
| 5,973,827 | A | 10/1999 | Chipper | |
| 6,114,671 | A | 9/2000 | Wehner et al. | |
| 6,134,366 | A | 10/2000 | Loeb et al. | |
| 6,353,421 | B1 * | 3/2002 | Lalezari | H01Q 1/288 |
| | | | | 343/881 |
| 6,426,834 | B1 | 7/2002 | Braunecker et al. | |
| 6,487,342 | B1 | 11/2002 | Wu et al. | |
| 6,505,381 | B1 * | 1/2003 | Thomson | B64G 1/222 |
| | | | | 16/282 |
| 6,707,603 | B2 | 3/2004 | Ansley et al. | |
| 6,888,613 | B2 | 5/2005 | Robins et al. | |
| 7,557,995 | B1 * | 7/2009 | Lloyd | G02B 23/16 |
| | | | | 359/601 |
| 7,672,527 | B2 * | 3/2010 | Arenberg | G02B 3/08 |
| | | | | 359/742 |
| 7,730,925 | B1 * | 6/2010 | Pereira | E06B 9/262 |
| | | | | 160/348 |
| 8,664,570 | B2 | 3/2014 | Odeh | |
| 9,100,996 | B2 | 8/2015 | Lisinski et al. | |
| 2002/0071472 | A1 | 6/2002 | Dickson et al. | |
| 2002/0158131 | A1 | 10/2002 | Dickson et al. | |
| 2003/0206338 | A1 | 11/2003 | Cook | |
| 2004/0195233 | A1 | 10/2004 | Gerhardinger et al. | |
| 2006/0174930 | A1 * | 8/2006 | Murphy | B64G 1/443 |
| | | | | 136/246 |
| 2010/0200777 | A1 | 8/2010 | Hauf | |
| 2010/0319270 | A1 * | 12/2010 | Slade | B64G 1/222 |
| | | | | 52/71 |
| 2010/0321758 | A1 | 12/2010 | Bugno et al. | |
| 2011/0094093 | A1 | 4/2011 | Goldstein et al. | |
| 2011/0242663 | A1 * | 10/2011 | Daily | G02B 5/005 |
| | | | | 359/601 |
| 2012/0012154 | A1 * | 1/2012 | Keller | B64G 1/222 |
| | | | | 136/245 |
| 2013/0021789 | A1 | 1/2013 | Dahm | |
| 2015/0352881 | A1 | 12/2015 | Seils et al. | |

OTHER PUBLICATIONS

"DARPA developing giant folding space telescope", Dec. 8, 2013, printed May 17, 2016 from http://www.gizmag.com/darpa-folding-telescope/30039, 6 pages.*

Anderson et al. "Photon Sieve Telescope," Proceedings of SPIE, Jun. 2006, vol. 6265, 626523, 8 pages.

Hansen "Developing Lightweight Optics for Space," Science & Technology Review, Jan./Feb. 2013, 4 pages.

Meinel et al. "Large membrane space optics: imagery and aberrations of diffractive and holographic achromatized optical elements of high diffraction order," Optical Engineering, Aug. 2002, vol. 41, No. 8, pp. 1995-2007.

* cited by examiner

STOWED GEOMETRY

25% DEPLOYED

50% DEPLOYED

75% DEPLOYED

FULLY DEPLOYED

DEPLOYABLE STRUCTURE

CROSS-REFERENCE TO RELATED APPLICATIONS

This application claims the benefit of U.S. Provisional Patent Application Ser. No. 61/922,539, filed Dec. 31, 2013, the entire disclosure of which is hereby incorporated herein by reference.

STATEMENT REGARDING FEDERALLY SPONSORED RESEARCH OR DEVELOPMENT

This invention was made with Government support under agreement number HR 0011-10-C-0157 awarded by DARPA. The Government has certain rights in the invention.

FIELD

Methods and systems related to a space-based deployable structure are provided.

BACKGROUND

It is often desirable to deploy relatively large structures in space. For example, telescopes, antennas, and other instruments can benefit from including large optical elements. However, such structures must fit within the relatively restricted cargo volume of a launch vehicle.

In order to provide relatively large elements as part of space-based instruments, techniques and structures have been developed that allow such elements to be carried in the launch vehicle in a folded or otherwise compact form. The element is then unfolded or otherwise deployed after that element has been removed from the launch vehicle. With respect to such techniques and structures, it is important to provide an element that can be deployed reliably, and with high precision.

Deployable structures, such as the primary element of telescopes, have been developed that unfold like a Chinese fan. Other systems have been proposed that unfold linearly. Still other proposed designs utilize an origami or umbrella type structure. However, such designs can suffer from relatively imprecise forms and insufficient stability in a deployed state, and insufficient reliability with respect to successful deployment of the structure.

SUMMARY

In accordance with at least some embodiments, a deployable structure has a folded configuration that is relatively compact, for transport to a deployment location. For example, in the folded configuration, the deployable structure can be dimensioned to fit within a standard evolved expendable launch vehicle (EELV) fairing. In a deployed configuration, the deployable structure may comprise an annular structure. In at least some embodiments, the deployable structure is the primary element of a space-based telescope. More particularly, the deployable structure may provide a diffractive optical element. In other embodiments, the deployable structure may provide a refractive or reflective optical element. In accordance with still other embodiments, the deployable structure discussed herein can be utilized to provide a relatively compact structure that can be deployed into a relatively large planar structure with high reliability.

The deployable structure includes a number of rigid panel elements or petals. In accordance with embodiments of the present disclosure, any even number of rigid panel elements can be provided. Each of the rigid panel elements is joined to two adjacent rigid panel elements. In particular, at least one hinge interconnects an adjacent pair of panel elements to one another. The hinges allow adjacent panel elements to fold relative to one another in alternating directions to form folded pairs of panel elements when the deployable structure is in the folded configuration.

In the folded configuration, a first hinge interconnecting a first panel element to a second panel element adjacent the first panel element on a first side of the first panel element allows the second panel element to fold in a first direction relative to a plane of the first panel element. A second hinge interconnecting the first panel element to a third panel element adjacent the first panel element on a second side of the first panel element allows the third panel element to fold in a second direction relative to the plane of the first panel element. In accordance with embodiments of the present disclosure, there are at least three folded pairs of panel elements when the deployable structure is in the folded configuration. Accordingly, the deployable structure includes at least six panel elements. In accordance with at least some embodiments of the present disclosure, the number of panel elements is an even number of six or greater. In accordance with further embodiments, the number of pairs of panel elements is evenly divisible by three.

The hinges allow the panel elements to transition from the stowed configuration, in which pairs of panel elements are folded against one another, to the deployed configuration. Biasing members can be incorporated into the hinges and/or can be separately provided to transition the deployable structure to the deployed configuration when the deployable structure is released from the folded configuration. In the deployed configuration, the deployable structure may have an annular form. In addition, locating assemblies maintain the relative position of panel elements when the deployable structure is in the deployed configuration.

In plan view the shape of the individual panel elements can be trapezoidal or approximately trapezoidal. Accordingly, each panel element can have a relatively short side that faces a center point of the annular deployed structure and a relatively long side opposite the short side that defines a portion of the outer circumference of the annular deployed structure. The sides of each panel element are not parallel to another, and each side is joined by a hinge to a side of an adjacent panel element.

Each of the panel elements can include a perimeter frame with first and second side members, an inner end member, and an outer end member. The perimeter frame can function to support one or more optical elements, directly or in connection with a sled assembly or other support structure.

Additional features and advantages of embodiments of the present disclosure will become more readily apparent from the following description, particularly when taken together with the accompanying drawings.

DETAILED DESCRIPTION

Figure 1A:
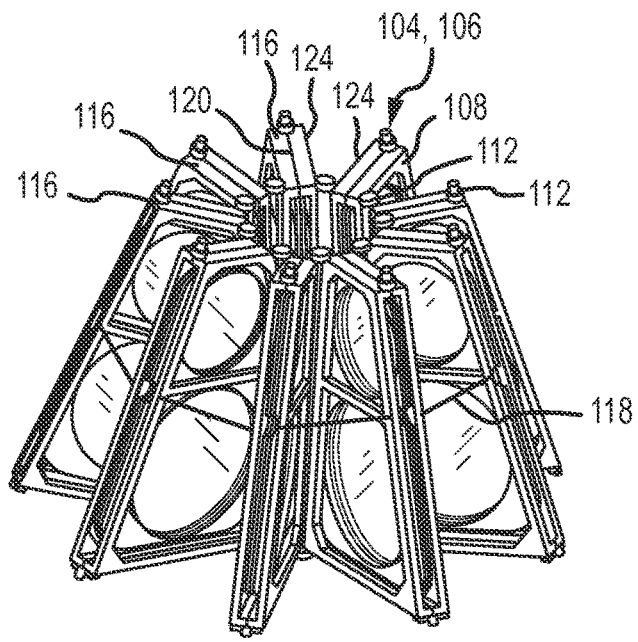
FIG. 1A depicts a deployable structure in accordance with embodiments of the present disclosure in a perspective view in a stowed configuration.
Figure 1B:
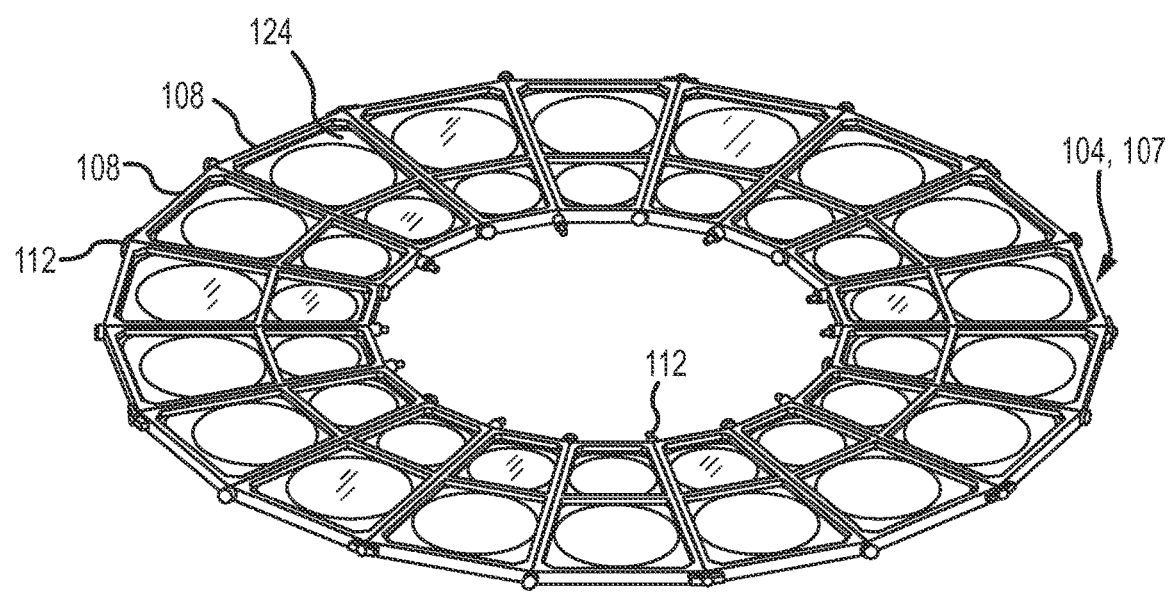
FIG. 1B depicts the deployable structure of FIG. 1A in a perspective view in a deployed configuration.
Figure 2A:
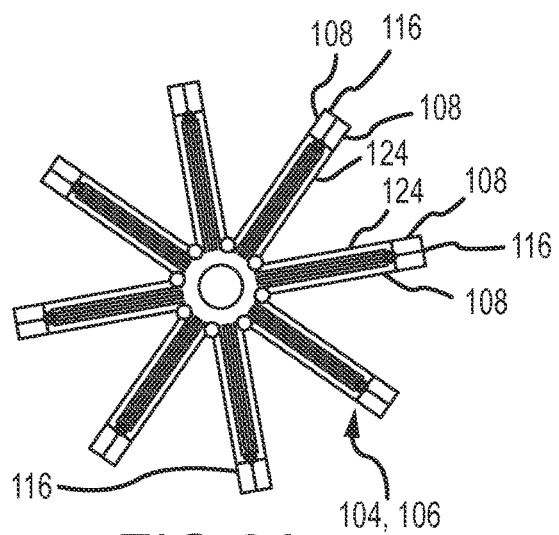
FIG. 2A depicts the deployable structure of FIG. 1A in plan view in the stowed configuration.
Figure 2B:
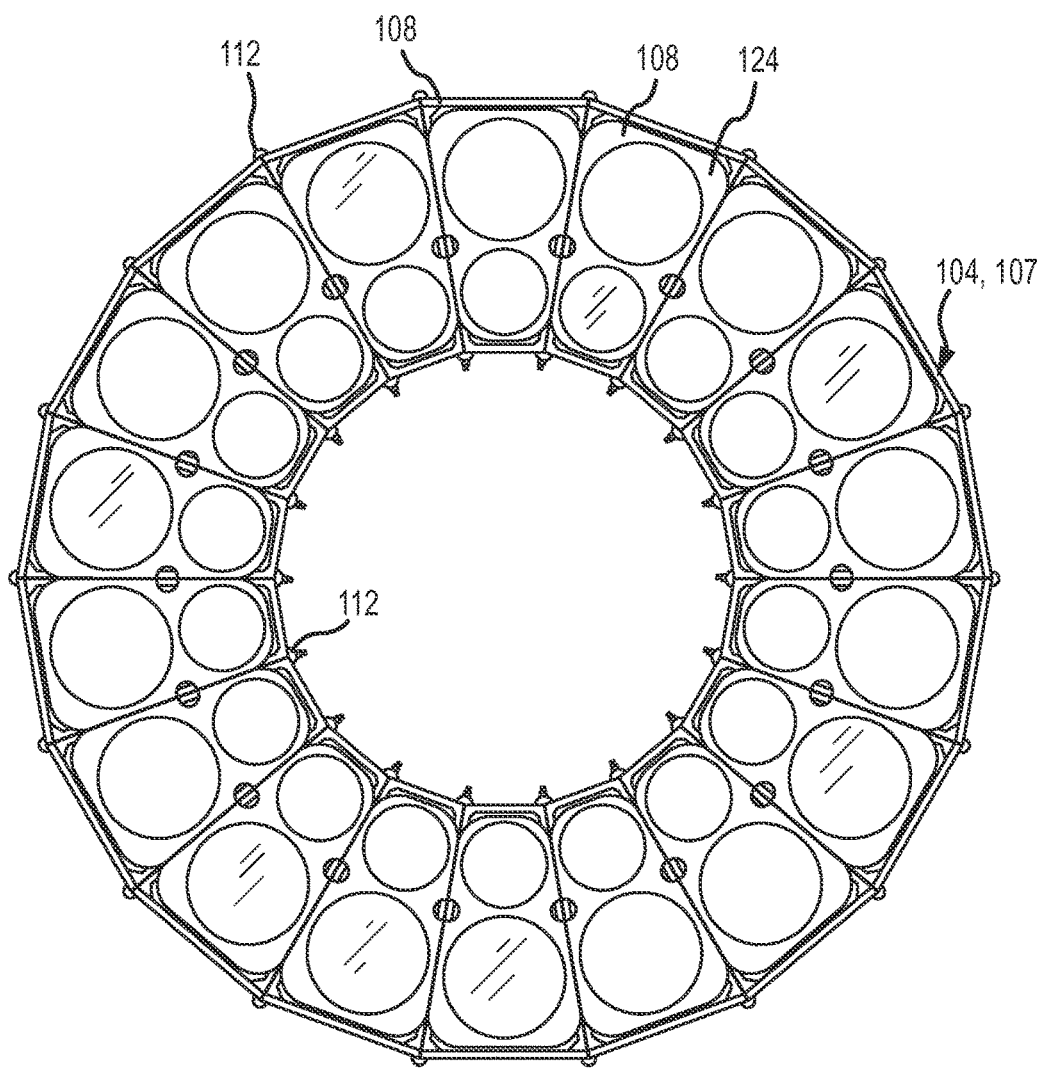
FIG. 2B depicts the deployable structure of FIG. 1A in plan view in the deployed configuration.
Figure 3A:
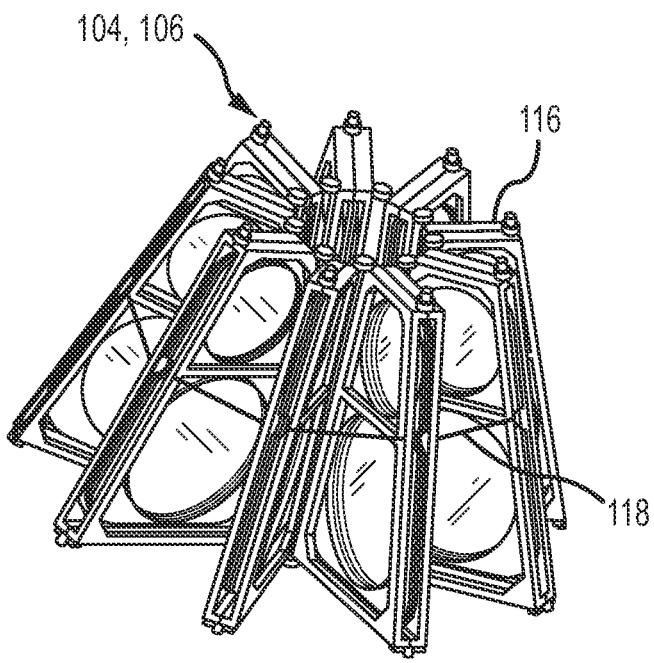
FIGS. 3A-3E depict a deployment sequence of the deployable structure of FIG. 1A.
Figure 3B:
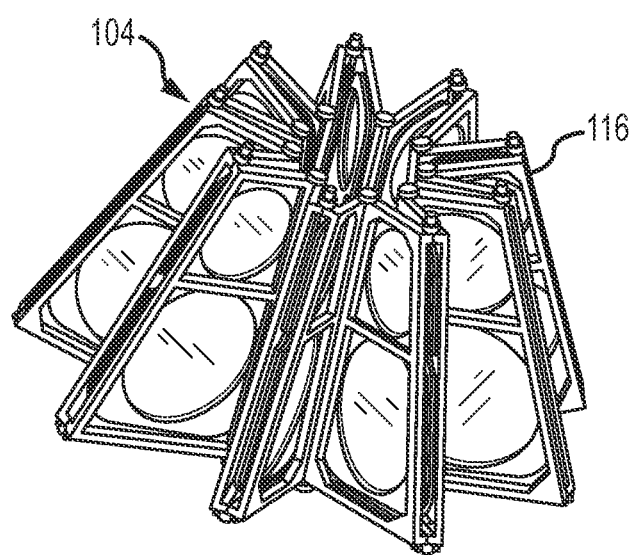
Figure 3C:
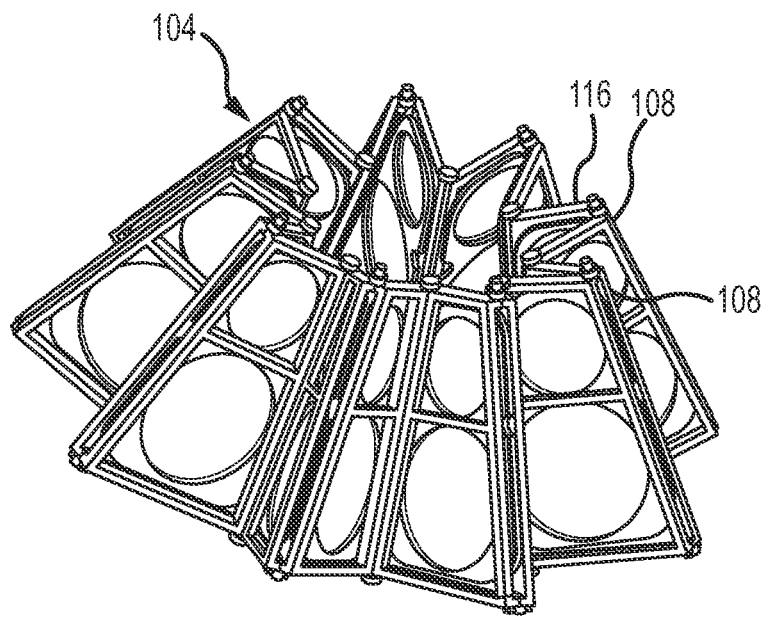
Figure 3D:
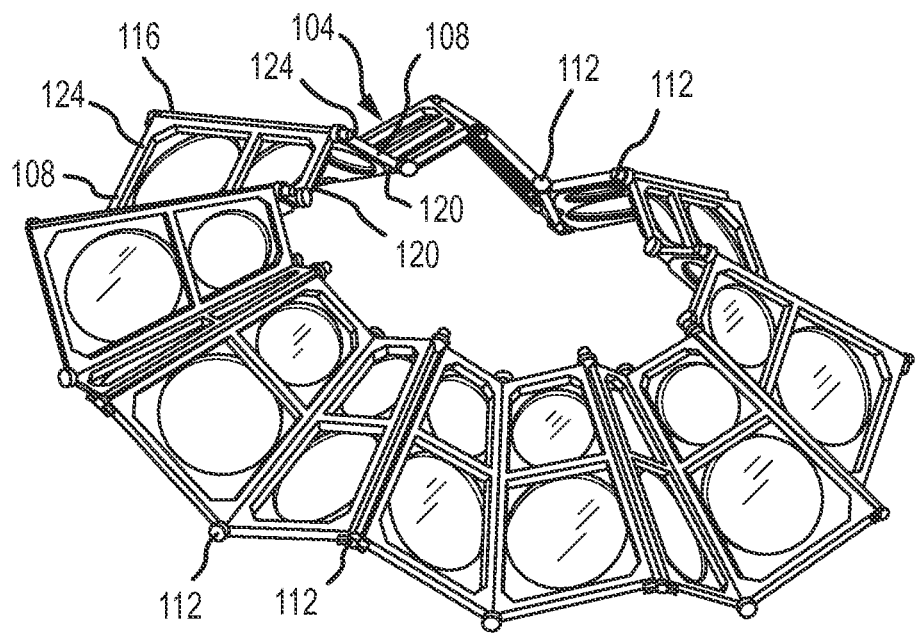
Figure 3E:
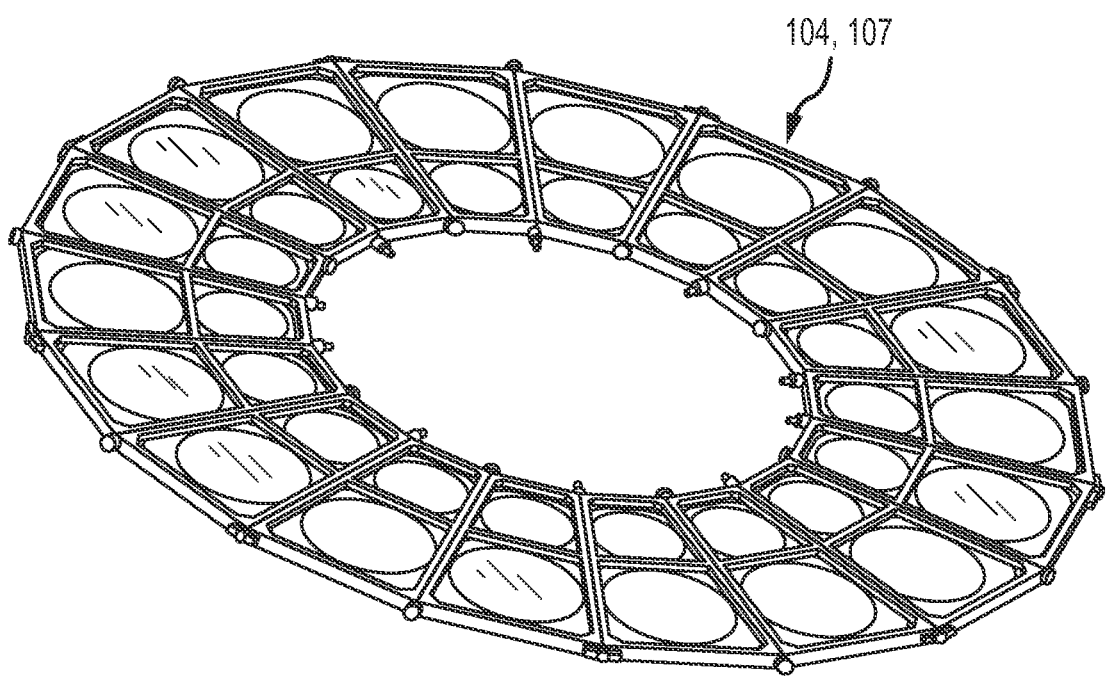

FIGS. 1A and 1B depict a deployable structure 104 in accordance with embodiments of the present disclosure in a perspective view. Specifically, FIG. 1A depicts the deployable structure 104 in a folded or stowed configuration (also referred to herein as folded or stowed structure 106), and FIG. 1B shows the deployable structure 104 in a deployed configuration (also referred to herein as deployed structure 107). The deployable structure 104 of FIGS. 1A and 1B is shown in plan view in FIG. 2A in the stowed configuration (i.e., the folded or stowed structure 106 is shown in plan view), and in FIG. 2B in the deployed configuration (i.e. the deployed structure 107 is shown in plan view). The deployable structure 104 includes an even number of petals or panel elements 108. The panel elements 108 are joined to adjacent panel elements 108 by hinges 112, such that the panel elements 108 fold relative to one another in alternating directions to form folded pairs 116 of panel elements 108 when the deployable structure 104 is in the folded configuration. More particularly, in the stowed configuration, a first surface 120 of each panel element 108 faces a first surface 120 of a paired panel element 108, and a second surface 124 of each panel element 108 faces a second surface 124 of an adjacent panel element 108. In accordance with embodiments of the present disclosure, the number of folded pairs 116 is equal to three or more. In accordance with further embodiments, the number of folded pairs 116 is equal to 3N, where N is any integer number greater than or equal to one.

The folded structure 106 occupies a volume that generally has the form of a truncated cone. Moreover, in the stowed configuration, the deployable structure 104 features pairs 116 of panel elements 108 that lie in parallel or nearly parallel (i.e., at an angle of less than 10° with respect to one another). In addition, the folded pairs 116 of panel elements 108 can be arranged such that they are symmetric about radius lines that are evenly spaced about a center point of the folded structure 106. As discussed in greater detail elsewhere herein, the deployable structure 104 can include biasing elements that provide the energy necessary to reliably move the deployable structure 104 from the stowed configuration to the deployed configuration. Accordingly, in order to maintain the deployable structure 104 in the stowed configuration, retention straps or bands 118 (see FIG. 1A) can be provided that connect the outer sides or edges of adjacent folded pairs 116 of panel elements 108 together, and/or continuous bands that extend around the outer edges of the folded pairs 116 of panel elements 108.

The deployed structure 107 can have a generally annular form in plan view. Accordingly, the sides of all the panel elements 108 and the hinges 112 generally lie along radii of the deployed structure 107. In addition, the deployable structure 104 is relatively planar in the deployed configuration, at least as compared to the stowed configuration. In accordance with still other embodiments, the deployed structure 107 may approximate a concave surface when viewed from a first side, and may approximate a convex surface when viewed from a second side opposite the first side.

FIGS. 3A-3E depict a deployment sequence of the deployable structure 104 in a series of perspective views. In a first step (Step A), shown in FIG. 3A, the deployable structure 104 is shown as a folded structure 106, completely folded. While in the stowed configuration, one or more retention straps or bands 118 can maintain the deployable structure 104 in the stowed configuration. At the moment of deployment, the retention straps or bands 118 can be released, to initiate the deployment sequence. In steps B, C, and D (FIGS. 3B, 3C and 3D), the deployable structure 104 is shown 25%, 50%, and 75% deployed respectively. Finally, in step E (FIG. 3E), the deployable structure 104 is shown as a deployed structure 107, fully deployed. As can be appreciated from the present disclosure, folded pairs 116 of panel elements comprise two panel elements 108 that, in the folded configuration, are folded closely against (e.g. parallel or almost parallel) one another. Adjacent folded pairs 116 are separated from one another by an angle that is approximately equal to 360 degrees divided by the number of folded pairs 116 included in the deployable structure 104. In the fully deployed configuration, the angle between panel elements 108 that form a folded pair 116 when in the folded configuration can be the same or close to (e.g. within 10 degrees of) adjacent panel elements belonging to other folded pairs 116.

Figure 4:
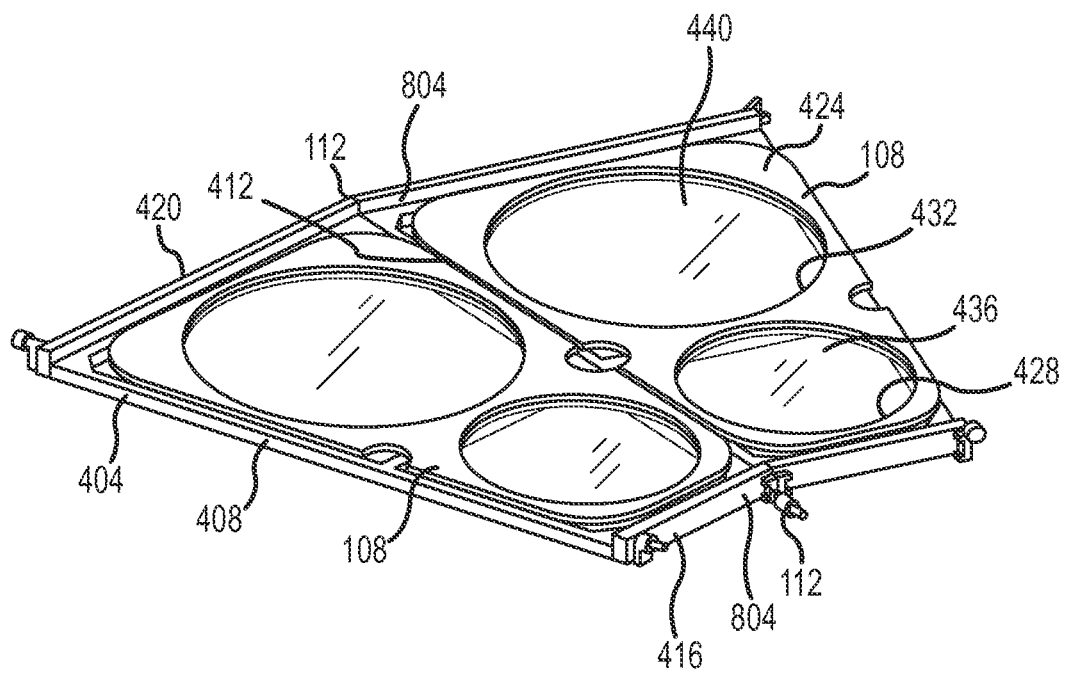
FIG. 4 depicts a pair of panel elements in accordance with embodiments of the present disclosure.
Figure 5:
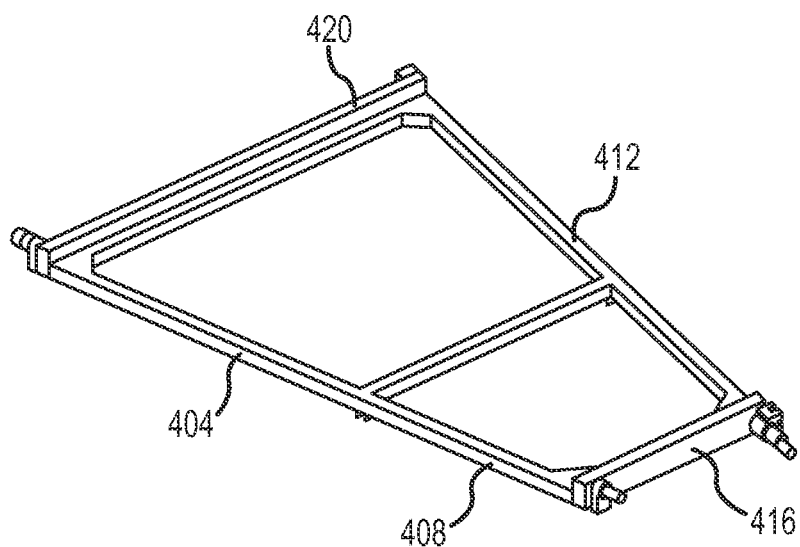
FIG. 5 depicts a backing assembly of a panel element in accordance with embodiments of the present disclosure.

FIG. 4 depicts a pair of panel elements 108 in accordance with embodiments of the present disclosure. The panel elements 108 are joined to one another by hinges 112. The panel elements 108 include a back assembly or perimeter frame 404. In the illustrated embodiment, the perimeter frame 404 includes first 408 and second 412 side members or edges, an inner end member or edge 416, and an outer end member or edge 420 (see also FIG. 5). In accordance with at least some embodiments, the first 408 and second 412 side members in each panel element 108 are of equal length. The inner end member 416 is shorter than the outer end member 420. In the illustrated embodiment, the inner end member 416 and outer end member 420 are depicted as being linear elements that approximate a circular inner aperture and a circular outer diameter of the deployed structure 107. However, the inner end member 416 can be curved, so as to comprise an arc of a circular inner aperture of the annular deployed structure 107, and/or the outer end member 420 can be curved to comprise an arc of a circular outer diameter of the annular deployed structure 107.

Figure 6:
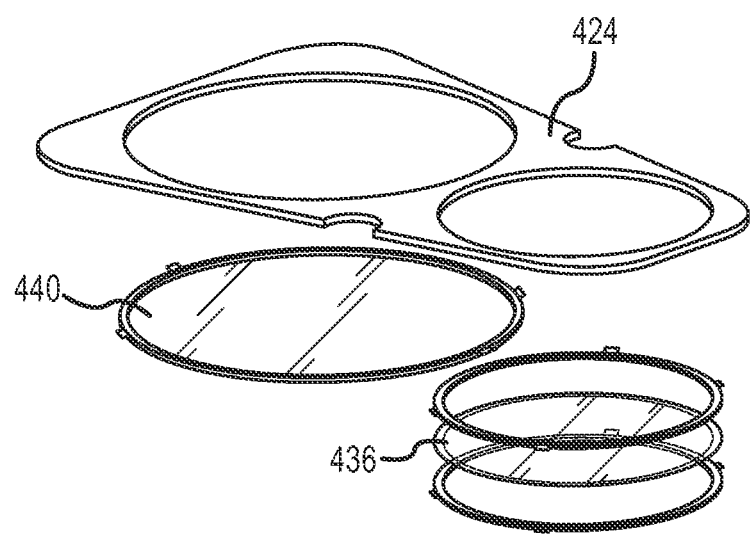
FIG. 6 depicts a sled assembly of a panel element in accordance with embodiments of the present disclosure.

In addition, the panel elements 108 can include a sled assembly 424 that is supported by the perimeter frame 404 (see also FIG. 6). The sled assembly 424 includes first 428 and second 432 apertures for receiving first 436 and second 440 optical elements respectively. The optical elements 436, 440 may, for example, comprise transmissive, diffractive optical elements. As further examples, the optical elements 436, 440 may comprise refractive optical elements, reflective optical elements, solar panels, sail panels, an active radio frequency antenna or antennas, a passive radio frequency antenna or antennas, or the like. In addition, although illustrated as circular elements, the optical elements 436, 440 may comprise trapezoidal elements, or any other shape. In addition, although two optical elements 436, 440 are shown, a panel element 108 can include any number of such elements.

Figure 7:
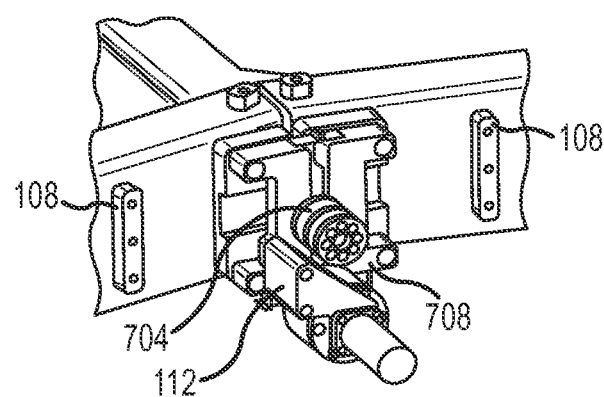
FIG. 7 depicts a deployment hinge in accordance with embodiments of the present disclosure.

FIG. 7 illustrates an example hinge 112 in accordance with embodiments of the present disclosure. Adjacent panel elements 108 are connected by one or more hinges 112, which allows the deployable structure 104 to transition from a folded configuration to a deployed configuration. In addition, some or all of the hinges 112 can incorporate or be associated with a spring or other biasing member 704 that is operative to bias the deployable structure 104 to the deployed configuration. Accordingly, the deployable structure 104 can be "self-powered" with respect to deployment of the structure 104. In accordance with still further embodiments of the present disclosure, the hinges 112 can incorporate a damper mechanism 708 to control the rate at which the deployable structure 104 transitions from the folded configuration to the deployed configuration. Accordingly, when the deployable structure 104 has reached a deployment location, that structure can automatically place itself in the deployed configuration upon separation from the launch vehicle. Although a hinge 112 in the form of a pivoting mechanism is shown in FIG. 7, other embodiments of the present disclosure can incorporate other types of hinges. For example, a hinge 112 may be a flexure type hinge. As a further example, a hinge 112 may be a flexure type hinge that uses a portion of a flexible membrane provided as part of one or more panel elements 108 as the flexure of a flexure type hinge. In accordance with further embodiments, a hinge 112 in the form of a flexure type hinge can also provide a biasing force. A separate biasing member 704 can therefore be replaced or augmented by a flexure that operates as both a hinge 112 and a biasing member 704. In accordance with still other embodiments, hinges 112 of different types can be included in the deployable structure 104.

Figure 8:
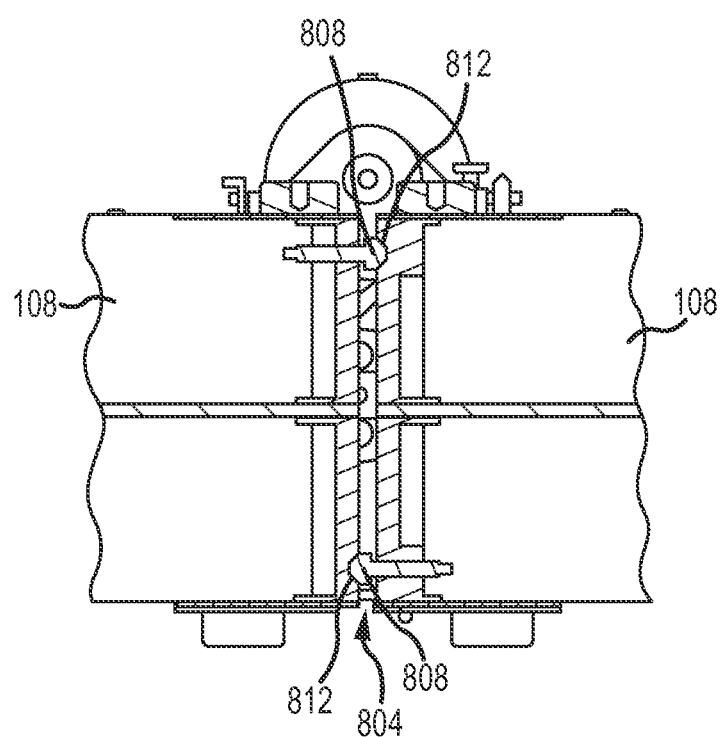
FIG. 8 depicts a locating interface in accordance with embodiments of the present disclosure in a closed configuration.

A locating interface assembly 804 is depicted in FIG. 8. In general, each panel element 108 includes a plurality of locating interface members or assemblies 804. The locating interface assemblies 804 maintain the relative positions of the panel elements 108 of the deployable structure 104 in the deployed configuration, after the deployment sequence has been completed. More particularly, one or more locating interface assemblies 804 of any one panel element 108 cooperates with one or more locating interface assemblies of adjacent panel elements 108 to maintain a desired relative positioning of the panel elements 108 in the deployed structure 107. Three or more locating interface assemblies 804 can be provided between adjacent panel elements 108. In accordance with embodiments of the present disclosure, a locating interface assembly 804 can include at least one of a protruding element 808 and a receiving element 812. In general, a protruding element 808 of a locating interface assembly 804 associated with a panel element 108 is received by a receiving element 812 of a locating interface 804 assembly of an adjacent panel element 108 when the deployable structure 104 is in the deployed configuration. As examples, a protruding element 808 may be in the form of a hemisphere, and the receiving element 812 can be in the form of a cone or a groove (e.g., a V-groove). In accordance with further embodiments, between any two adjacent panel elements 108, at least a first one of the locating interface assemblies 804 features a hemispherical protruding element 808 in combination with a conical receiving element 812, and at least a second one of the locating interface assemblies 804 features a hemispherical protruding element 808 in combination with a grooved receiving element 812. In accordance with still further embodiments, between any two adjacent panel elements 108, one locating interface assembly 804 features a hemispherical protruding element 808 in combination with a conical receiving element 812, and two or more locating interface assemblies 804 feature hemispherical protruding elements 808 in combination with grooved receiving elements 812.

Figure 9A:
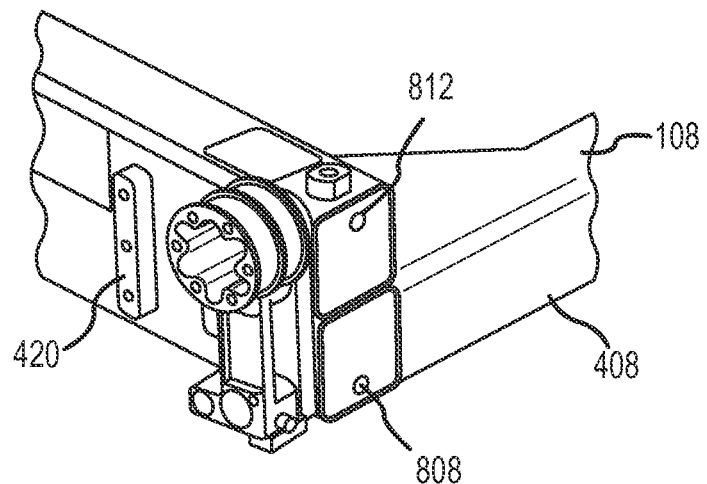
FIGS. 9A and 9B depict locating interfaces in accordance with embodiments of the present disclosure in an open configuration.
Figure 9B:
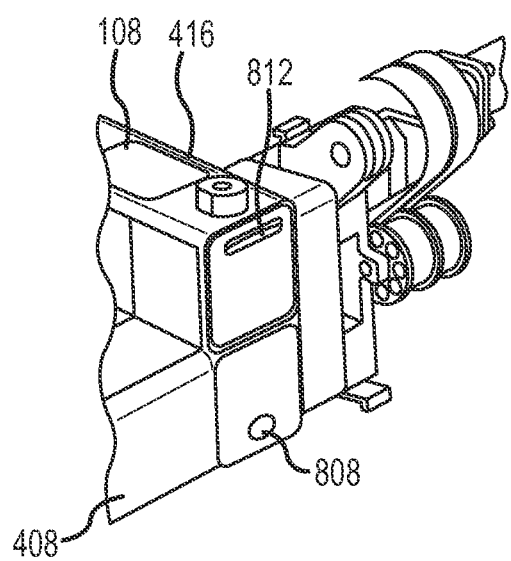

FIGS. 9A and 9B depict elements 808, 812 of locating interfaces 804, and exemplary locations of those portions along a side 408 (or 412) of a panel element 108. In particular, the elements 808, 812 of the locating interfaces 804 can be at or towards the ends 416, 420 of the panel element 108. Moreover, the elements 808, 812 can be formed in the perimeter frame 404 itself, or as part of a plate or other assembly attached to the perimeter frame 404. In FIG. 9A, a hemispherical protruding element 808 and a conical receiving element 812 are illustrated. In FIG. 9B, a hemispherical protruding element 808 and a grooved receiving element 812 are illustrated. As can be appreciated by one of skill in the art after consideration of the present disclosure, the protruding elements 808 shown in FIGS. 9A and 9B would be received by a receiving element 812 formed on or connected to an adjacent panel element 108, while the receiving elements 812 would receive a protruding element 808 formed on or connected to the adjacent panel element when the deployable structure 104 is in the deployed configuration.

In accordance with embodiments of the present disclosure, the deployable structure 104 may be biased towards the deployed configuration by a spring or other biasing member 704. Accordingly, the deployable structure 104 may be configured to automatically transition itself to the deployed configuration when the deployable structure 104 is released from a launch vehicle or launch vehicle component. The energy required to transition deployable structure 104 to the deployed configuration can be provided by springs or other biasing members 704, for example that are incorporated into the hinges 112. The biasing members 704 can continue to provide a biasing force that, in combination with the locating members or interfaces 804, maintains the deployable structure 104 in the deployed configuration. Moreover, the deployed configuration can be maintained with high precision by the biasing members 704, the hinges 112, and the cooperating locating members 804. Alternatively or in addition, locating members 804 can be provided that lock the deployable structure 104 in the deployed configuration. The disclosed folded configuration, with at least three folded pairs of panel elements 108, in combination with the biasing force and at least three locating members 804 between adjacent panel elements 108, allows the deployable structure 104 to be deployed and maintained in the deployed configuration with high reliability.

Figure 10:
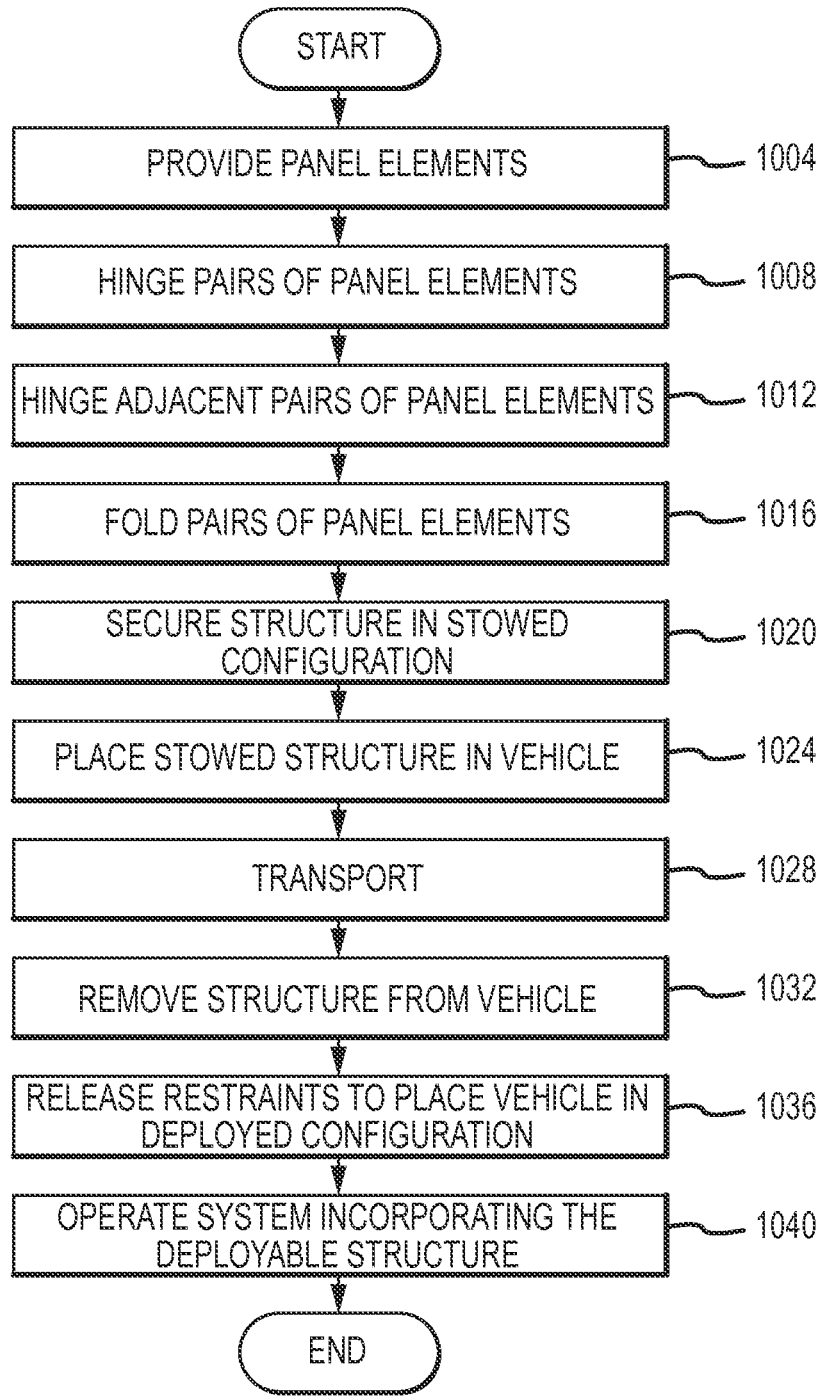
FIG. 10 is a flowchart depicting aspects of a method for providing a deployable structure in accordance with embodiments of the present disclosure.

With reference now to FIG. 10, aspects of a method for providing a deployable structure 104 in accordance with embodiments of the present disclosure are depicted. Initially, a plurality of panel elements 108 are provided (step 1004). As discussed elsewhere herein, the panel elements 108 may be trapezoidal, with non-parallel side members or edges. Next, a plurality of pairs 116 of panel elements 108 are formed by hinging a first side edge 408 of a first panel element 108 to a second side edge 412 of a second panel element 108 (step 1008). The hinges 112 allow the first and second panel elements 108 within each pair 116 to fold relative to one another, such that a first surface 120 of each of the panel elements 108 within each pair 116 face one another. The panel elements 108 within each pair 116 can be biased towards the deployed position. At step 1012, adjacent pairs 116 of panel elements 108 are connected to one another by hinges 112. When this step is complete, the panel elements 108 will be connected in a continuous ring or annular structure. The hinges 112 connecting adjacent pairs 116 of panel elements 108 to one another operate so as to allow a second surface 124 of a first panel element 108 of a first pair 116 to face a second surface 124 of a second panel element 108 of a second pair 116. Moreover, the panel elements 108 in adjacent pairs can be biased towards the deployed configuration by springs or other biasing members 704 provided as part of the hinges 112, and/or as separate biasing members 704.

At step 1016, pairs 116 of panel elements 108 are folded flat, against the biasing force, such that the first surfaces 120 of the panel elements 108 within each pair 116 face one another. In accordance with at least some embodiments, the panel elements 104 within each pair 116 can be folded so that the first surfaces 120 are in parallel planes. In accordance with other embodiments, the panel elements 108 may be folded so that the first surfaces 120 are within nearly parallel planes (e.g., within about 10° of one another). As can be appreciated by one of skill in the art after consideration of the present disclosure, folding the panel elements 108 within each pair 116 against one another will have the effect of drawing up the deployable structure 104, such that the maximum diameter of the deployable structure 104 is reduced as compared to the maximum diameter in the deployed configuration. Moreover, folding the deployable structure 104 will result in panel elements 108 in adjacent pairs 116 being folded towards one another. Thus folded, the deployable structure 104 is in a stowed configuration (i.e. is in the form of the folded structure 106). In accordance with embodiments of the present disclosure, the second surfaces 124 of adjacent panel elements 108 of adjacent pairs 116 lie in planes that intersect one another at a first angle, where the first angle is greater than zero. In accordance with still further embodiments, the angle of intersection of planes corresponding to the second surfaces 124 of adjacent panel elements 108 of adjacent pairs 116 is 10° or greater. Thus configured, the deployable structure 104 is secured in the stowed configuration by one or more bands or restraints 118 (step 1020).

The folded structure 106 can then be placed into the vehicle that will be used to transport the deployable structure 104 to a desired location (step 1024). For example, the deployable structure 104 may be placed within the fairing of a launch or other transport vehicle. The deployable structure 104, in the stowed configuration, can then be transported to the desired location (step 1028).

After the deployable structure 104 has been brought to the desired location, the deployable structure 104 can be removed from the vehicle (step 1032). The restraints 118 can then be released, allowing the biasing member 704 to place the deployable structure 104 in the deployed configuration (step 1036). In the deployed configuration, the locating interface assemblies 804 in cooperation with the biasing members 704, maintain adjacent panel elements 108 in a desired location relative to one another. The deployable structure 104 is then operational, and thus the telescope or other assembly or instrument of which the deployable structure 104 is a part can be operated (step 1040).

In an exemplary embodiment, the deployable structure 104 comprises a diffractive primary optical element of a space-deployed telescope. However, embodiments of the present disclosure are not so limited. In particular, a deployable structure 104 can be used to provide a precisely configured, planar or nearly planar component that can be transported to a deployment location in a relatively compact, folded configuration, and that can be deployed with high reliability, using a self-powered mechanism.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A deployable structure, comprising:
a plurality of panel elements, wherein each of the panel elements includes a perimeter having a first side edge and a second side edge, wherein the first side edge of a first panel element is not parallel to the second side edge of the first panel element, and wherein a total number of panel elements included in the plurality of panel elements is an even number; and
a plurality of hinges, wherein at least a first hinge interconnects adjacent panel elements within a pair of panel elements of the plurality of panel elements to one another such that first surfaces of the panel elements within the pair can be folded towards one another, and wherein at least a second hinge interconnects adjacent panel elements in adjacent pairs of panel elements to one another such that second surfaces of the panel elements in the adjacent pairs can be folded towards one another; and
a plurality of biasing members, wherein the biasing members bias the deployable structure towards a deployed configuration, and wherein the deployed configuration is planar.

2. The deployable structure of claim 1, wherein a number of pairs of panel elements included in the deployable structure is equal to a multiple of three.

3. The deployable structure of claim 1, wherein the biasing members are springs, and wherein at least some of the hinges are pivoting mechanisms.

4. The deployable structure of claim 1, wherein the deployed configuration of the deployable structure is approximately annular.

5. The deployable structure of claim 1, further comprising:
a plurality of locating interface assemblies, wherein at least three locating interfaces are located between adjacent panel elements.

6. A deployable structure, comprising:
a plurality of panel elements, wherein each of the panel elements includes a perimeter having a first side edge and a second side edge, wherein the first side edge of a first panel element is not parallel to the second side edge of the first panel element, and wherein a total number of panel elements included in the plurality of panel elements is an even number; and a plurality of hinges, wherein at least a first hinge interconnects adjacent panel elements within a pair of panel elements of the plurality of panel elements to one another such that first surfaces of the panel elements within the pair can be folded towards one another, and wherein at least a second hinge interconnects adjacent panel elements in adjacent pairs of panel elements to one another such that second surfaces of the panel elements in the adjacent pairs can be folded towards one another;

a plurality of biasing members, wherein the biasing members bias the deployable structure towards a deployed configuration; and a plurality of locating interface assemblies, wherein at least three locating interfaces are located between adjacent panel elements, each locating interface including at least one of:
a protruding member; and
a receiving member.

7. The deployable structure of claim 6, wherein a protruding member of a first locating interface assembly associated with a first panel element and a receiving member of a second locating interface assembly associated with a second panel element are in contact with one another when the deployable structure is in the deployed configuration.

8. A deployable structure, comprising:
a plurality of panel elements, wherein each of the panel elements includes a perimeter having a first side edge and a second side edge, wherein the first side edge of a first panel element is not parallel to the second side edge of the first panel element, and wherein a total number of panel elements included in the plurality of panel elements is an even number; and a plurality of hinges, wherein at least a first hinge interconnects adjacent panel elements within a pair of panel elements of the plurality of panel elements to one another such that first surfaces of the panel elements within the pair can be folded towards one another, wherein at least a second hinge interconnects adjacent panel elements in adjacent pairs of panel elements to one another such that second surfaces of the panel elements in the adjacent pairs can be folded towards one another, wherein each of the panel elements includes at least one optical element, and wherein the at least one optical element is a transmissive diffractive optical element.

9. The deployable structure of claim 8, wherein the deployable structure is a primary optical element of a space-deployed telescope.

10. A deployable structure, comprising:
a plurality of panel elements, wherein each panel element in the plurality of panel elements includes first and second side edges, an inner edge, an outer edge, and first and second surfaces, wherein each of the panel elements is planar, and wherein the plurality of panel elements includes an even number of panel elements;

a plurality of hinges, wherein the first side edge of each panel element is interconnected by at least one of the hinges to the second side edge of an adjacent panel element, wherein for each of the panel elements the at least one hinge on the first side edge allows the adjacent panel element to pivot towards first surface of the panel element, and wherein for each of the panel elements the at least one hinge on the second side edge allows the other adjacent panel element to pivot towards the second surface of the panel element.

11. The deployable structure of claim 10, wherein a deployed configuration of the deployable structure is approximately annular.

12. The deployable structure of claim 10, wherein the deployable structure is movable from a stowed configuration to a deployed configuration.

13. The deployable structure of claim 12, further comprising:
a plurality of biasing members, wherein the deployable structure is biased towards the deployed configuration by the biasing members.

14. The deployable structure of claim 13, wherein the deployable structure has a form of a truncated cone in the stowed configuration, wherein the deployable structure has an annular form in the deployed configuration, and wherein each of the hinges is located along a radius of the truncated cone with the deployable structure in the stowed configuration and along a radius of the annular form in the deployed configuration.

15. A method for providing a deployable structure, comprising:
joining side edges of a plurality of panel elements to one another by hinges, wherein each panel element includes a first side edge, a second side edge, an inner edge, and an outer edge, wherein the first side edge of each panel element is interconnected to the second side edge of an adjacent panel element by at least one of the hinges;

biasing the panel elements towards a deployed configuration in which the deployable structure has an annular form, and in which the hinges lie along radii of the deployable structure in the deployed configuration, wherein the inner side edges of each of the panel elements define an aperture of the annular form, and wherein the outer side edges of each of the panel elements forms an outer perimeter of the annular form.

16. The method of claim 15, further comprising:
folding the panel elements in pairs, such that a first surface of each panel element faces a first surface of a paired panel element, and such that a second surface of each panel element faces a second surface of a panel element in an adjacent pair of panel elements, whereby the deployable structure is placed in a stowed configuration;

securing the deployable structure in the stowed configuration.

17. The method of claim 16, further comprising:
transporting the deployable structure to a deployment location while the deployable structure is in the stowed configuration.

18. The method of claim 17, further comprising:
releasing the deployable structure from the stowed configuration, wherein the panel elements are allowed to move into the deployed configuration.

19. The method of claim 16, wherein in the stored configuration the deployable structure has a form of a truncated cone.

* * * * *